US006187893B1

(12) United States Patent
Bruchmann et al.

(10) Patent No.: US 6,187,893 B1
(45) Date of Patent: Feb. 13, 2001

(54) TWO-COMPONENT POLYURETHANE SYSTEMS WHICH CONTAIN REACTIVE DILUENTS

(75) Inventors: Bernd Bruchmann, Freinsheim; Heinz-Dieter Lutter, Neckargemünd; Hans Renz, Meckenheim; Dietrich Scherzer, Neustadt; Günter Mohrhardt, Speyer, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/167,459

(22) Filed: Oct. 6, 1998

(30) Foreign Application Priority Data

Oct. 10, 1997 (DE) .............................................. 197 44 748

(51) Int. Cl.$^7$ .................................................. C08G 18/65
(52) U.S. Cl. ................................. 528/73; 528/79; 522/94; 521/170
(58) Field of Search ........................ 528/73, 79; 521/170; 522/94

(56) References Cited

U.S. PATENT DOCUMENTS

| 3,743,626 | 7/1973 | Emmons | 428/423.4 |
|---|---|---|---|
| 4,908,406 | 3/1990 | Muülhaupt et al. | 528/73 |
| 5,264,148 | 11/1993 | Chou et al. | 210/698 |
| 5,744,569 | 4/1998 | Bruchmann et al. | 528/73 |
| 5,817,731 | * 10/1998 | Yoshida | 528/45 |

FOREIGN PATENT DOCUMENTS

| 27 46 178A1 | 10/1977 | (DE) . |
|---|---|---|
| 0 326 512 | 8/1989 | (EP) . |
| 456073 | 11/1991 | (EP) . |
| 0 752 433 A2 | 6/1996 | (EP) . |
| 921041 | 3/1963 | (GB) . |

OTHER PUBLICATIONS

Chemical Abstracts, Columbus, Ohio; vol.: 105 1986; Sep. 8, No. 10.

* cited by examiner

Primary Examiner—Rachel Gorr
(74) Attorney, Agent, or Firm—Fernando A. Borrego

(57) ABSTRACT

Two-component polyurethane systems composed of an at least bifunctional polyisocyanate component and a polyol component have a polyol component which comprises at least one hydroxyl-containing cyclic acetal and/or ketal.

6 Claims, No Drawings

TWO-COMPONENT POLYURETHANE SYSTEMS WHICH CONTAIN REACTIVE DILUENTS

The invention relates to two-component polyurethane systems which contain reactive diluents.

Two-component polyurethane systems, which are composed of a poyisocyanate component and a polyol component, are known. In the reaction to give the polyurethane, it is of great importance that the polyol component, usually termed the A component, and the isocyanate component, usually termed the B component, are intimately mixed with one another. Only in this way is it possible to prepare polyurethanes which are free from defects.

However, the polyetherols, polyesterols, polyacrylates, etc. usually used as A components are usually markedly more viscous, because of their higher molecular weight, than the associated isocyanate components. This often causes incomplete mixing of the reaction partners unless complicated mixing technology is used, and the polyurethane obtained as end product may contain local defects resulting from defects in mixing.

Ideal mixing of a polyurethane system is generally achieved if both reaction partners have similar, and preferably very low, viscosities. At 23° C., most of the isocyanate components have viscosities in the range from 10 to 500 mPa·s, which can be handled without difficulty by usual mixing apparatus. The viscosities of the polyol components usually start at 1000 mPa·s and their upper limit results only from their handle ability at the temperature of processing. This means that polyols with very high viscosities or very high molecular weights cannot be used even if the desired property spectrum of the polyurethane would require polyols of this type.

A large number of ways are known for lowering the viscosity of the polyol component.

For example, it is possible to lower the viscosity by increasing the processing temperature. However, equipment frequently does not permit a temperature increase of this type, or the increase causes degradation of the polyol component. It is moreover possible for the polyol component used to be polyols with low average molecular weights. However, this possibility cannot realized in every application, since it affects the properties of the end products. When low-molecular-weight polyols are used, the build-up of the molecular weight of the polyurethane takes place more slowly, and, in particular in coating applications, causes lengthening of the time needed for a coating to become physically dry to the touch, as measured by its freedom from tack. Another way of lowering viscosity is to use solvents. Their use is, however, limited, because of their potential to contaminate the environment.

An elegant method for lowering the viscosity of high-molecular-weight products is the addition of reactive diluents. These lower the viscosity in the same way as a solvent, but, since they participate in the reaction, are incorporated into the polyurethane. Use is generally made of low-molecular-weight compounds which contain groups which react with isocyanates.

The use of low-molecular-weight and low-viscosity di- or triols, such as ethylene glycol, propylene glycol, dipropylene glycol, butanediol, glycerol and similar products, is well known and has been described many times. However, these alcohols have the disadvantage of forming hard phases in the polyurethane, and this can adversely affect the properties of foams or coatings. In the reaction with isocyanates, furthermore, a great amount of heat of reaction is generated, due to the high proportion of hydroxyl groups in the molecule, and therefore the polyurethane systems can overheat during the reaction and this may cause safety and processing problems.

The use of oxazolidines as reactive diluents in polyurethane systems is also known. Oxazolidines undergo ring-opening when exposed to moisture and then act as chain extenders or crosslinking agents. They are therefore used as drying agents in polyol components. Such systems are described, for example, in U.S. Pat. No. 3,743,626 and U.S. Pat. No. 5,264,148. A disadvantage of these systems is that oxazolidines are potential water scavengers and the shelf-life of the systems is therefore inadequate. In addition, the ring-opening produces amines, which form ureas with the isocyanates and/or intervene in the polyurethane reaction as catalysts. The resultant effects on the finished polyurethane of these phenomena are difficult to predict and therefore undesirable.

It is an object of the present invention to develop two-component polyurethane systems which contain reactive diluents which are simple to prepare, are incorporated into the polyurethane without difficulty and do not enter into side-reactions with the structural components of the polyurethane.

We have found that this object is achieved by using cyclic acetals and/or ketals as reactive diluents in two-component polyurethane systems.

The invention therefore provides two-component polyurethane systems made from one component which comprises compounds having at least two isocyanate groups, also termed isocyanate component, and one component, which comprises compounds having hydrogen atoms which react with isocyanate, also termed polyol component, wherein cyclic acetals and/or ketals are present as reactive diluents. The invention provides, furthermore, polyol components for two-component polyurethane systems, wherein these comprise hydroxyl-containing cyclic acetals and/or ketals as reactive diluents. The invention moreover provides a process for preparing polyurethanes by reacting polyisocyanates with compounds having at least two reactive hydrogen atoms, wherein the compounds having at least two reactive hydrogen atoms comprise cyclic acetals and/or ketals. The invention also provides for the use of cyclic acetals and/or ketals as reactive diluents in two-component polyurethane systems.

The cyclic acetals and ketals used according to the invention may preferably be prepared by reacting polyhydric alcohols with aldehydes or ketones.

It is advantageous here for the alcohols used as starting materials for the cyclic acetals and ketals used according to the invention to be alcohols usually used as structural components in polyurethane systems, most frequently as chain extenders or crosslinking agents. It is preferable to use alcohols which have at least three hydroxyl groups in the molecule, in particular glycerol and trimethylolpropane (TMP). In the case of the at least trihydric alcohols, two adjacent hydroxyl groups form a ring structure with the aldehyde molecule and/or ketone molecule, and free hydroxyl groups still remain in the molecule. Stepwise reaction of the reactive diluents can therefore occur during polyurethane formation, the free hydroxyl groups reacting initially and, after elimination of the aldehydes and/or ketones, the previously capped hydroxyl groups being able to react with the isocyanate groups.

The elimination of the blocking agents is preferably brought about by compounds which in any case are present in the polyurethane system, for example water, or else by traces of acid from the isocyanate component, or traces of acrylic acid from the acrylate polyols used for coating applications. Due to their volatility, the blocking agents spontaneously diffuse out of the polyurethane after they are eliminated. Because their amounts are usually small, this does not cause any damage to the environment. Aldehydes and ketones used are preferably those having from 1 to 12 carbon atoms, in particular from 3 to 6 carbon atoms, in their main chain.

Particularly suitable compounds are acetone, methyl ethyl ketone (MEK), methyl isobutyl ketone (MIBK), cyclopentanone, cyclohexanone, formaldehyde, acetaldehyde, propionaldehyde, butyraldehyde, isobutyraldehyde and benzaldehyde.

The cyclic acetals and ketals used according to the invention may be prepared very simply by reacting the corresponding alcohols with the aldehydes and/or ketones. It is can be advantageous here to work in solution. Possible solvents are those which do not react with the starting compounds, and for example are hydrocarbons or ethers. To achieve a good yield, the water produced during the reaction should be removed from the reaction mixture. After the reaction, the unreacted starting materials and the solvent, if any is used, are separated off, usually by distillation. The preparation of the cyclic acetals or ketals is described, for example, in EP 456 073.

For certain applications, it can be advantageous to modify the free hydroxyl group, for example by reacting with alkylene oxides. This reaction is preferably carried out by the base-catalyzed reaction mechanism, as familiar in the preparation of polyetheralcohols. The alkylene oxides used here are in particular ethylene oxide, propylene oxide and/or butylene oxide; basic compounds, such as amines, alkali metal hydroxides, alkaline-earth metal hydroxides, and/or alkali metal carbonates and alkaline-earth metal carbonates, in particular potassium hydroxide, are preferably used as catalyst.

The cyclic acetals and ketals may be used as reactive diluents in any two-component polyurethane system, in an amount of from 10 to 100% of the polyol component, the higher proportions being used preferably in coating applications.

Examples of such two-component polyurethane coating systems are those where the use of the cyclic acetals and/or ketals results in a marked decrease in the proportions of solvents.

The use of the cyclic acetals and ketals is also advantageous in producing fiber-reinforced polyurethane moldings, in particular those based on plant fibers, where better saturation of the fibers takes place due to the low viscosity of the polyol component. In addition, these systems are much easier to apply, by roller or spray, for example.

The cyclic acetals and ketals can also be used with advantage in polyurethane foam systems. The novel systems have excellent flow properties, so that it is possible to fill even complicated molds without difficulty. Surprisingly, flexible foams produced using the reactive diluents according to the invention have better elongation than conventional foams, without any fall-off in other mechanical properties. In addition, the mechanical properties of the foams remain at a high level over a wide range of proportions of the reactive diluents according to the invention, lessening the impact of metering inaccuracies during formulation.

The following examples are intended to describe the invention in more detail:

EXAMPLE 1
Preparation of acetone-capped trimethylolpropane (isopropylidene-TMP)

250 g of trimethylolpropane were refluxed for 24 h together with 750 ml of petroleum ether (boiling range from 30 to 75° C.), 750 ml of acetone and 0.15 g of p-toluenesulfonic acid monohydrate. The water produced in the reaction was then removed from the mixture via a water separator. The solution was cooled, 0.5 g of sodium methanolate was added, followed by stirring for 1 h at room temperature. The solution was filtered, the solvent was removed in a rotary evaporator, and the residue was distilled under reduced pressure.

Yield 78% of theory, boiling point from 71 to 72° C. (0.5 mbar)

EXAMPLE 2
Preparation of acetone-capped glycerol (isopropylideneglycerol)

552 g of glycerol, 1382 g of acetone, 1400 g of petroleum ether (boiling range from 30 to 75° C.) and 0.47 g of p-toluenesulfonic acid monohydrate were mixed and heated to the boiling point of the solvents. Using a water separator, the water produced in the reaction was removed. After 42 h, the reaction was terminated by adding 0.94 g of sodium methanolate. After cooling to room temperature, the reaction mixture was filtered, the solvents removed under reduced pressure in a rotary evaporator, and the residue worked up by distillation.

Yield 92% of theory, boiling point from 189 to 191° C.

Preparation of fiber-reinforced molded foams

EXAMPLE 3 (according to the invention)

A flax/sisal (1:1) mat with a weight per unit area of 1000 g/m$^2$ was placed into a heated multipart test mold, heated to 40° C. and measuring 500×200×2 mm, and was saturated with a mixture of 70 g of a sucrose-started polyoxypropylene polyol, with a hydroxyl number of 403 mg KOH/g and a viscosity at 23° C. of 5050 mPas, and 10 g of isopropylideneglycerol ($\eta$ 23° C.=10 mPas). The viscosity of the polyol mixture was 2100 mPas at 23° C., and it was possible to saturate the fiber mat without difficulty. The mat was then impregnated with 80 g of polymeric MDI (Lupranat® M 20 S), the mold was heated to 120° C., and the molding was demolded after 10 min.

The weight per unit area was 1510 g/m$^2$ and the flexural modulus of elasticity was determined as 3830 N/mm$^2$.

EXAMPLE 4 (Comparison)

A flax/sisal mat (1:1) with a weight per unit area of 1000 g/m$^2$ was placed into a multipart test mold, heated to 40° C. and measuring 500×200×2 mm, and was saturated with a mixture of 70 g of the sucrose polyol mentioned in Example 3 ($\eta$ 23° C.=5050 mPas) and 7 g of glycerol ($\eta$ 23° C.=800 mPas) . The proportion of 7 g of glycerol here corresponds in molar terms to the amount of 10 g of isopropylideneglycerol in Example 3. The viscosity of the polyol mixture was 4400 mPas at 23° C., and it was difficult to saturate the fiber mat. The mat was then impregnated with 80 g of polymeric MDI (Lupranat® M 20 S), the mold was heated to 120° C., and the molding was demolded after 10 min.

The weight per unit area was 1530 g/m$^2$ and the flexural modulus of elasticity was determined as 3410 N/mm$^2$.

Preparation of highly elastic flexible slab foams

EXAMPLES 5 TO 9

The polyol component starting materials given in Table 1 were mixed intensively with one another. The isocyanate amounts given in Table 1 were then admixed. The foaming reaction mixture was then introduced into a mold, open at the top, of dimensions 40 cm×40 cm, and stored overnight to cure the flexible polyurethane foam. The appropriate moldings according to the DIN or ASTM test methods given in Table 1 were taken from this foam slab and subjected to measurement. The values found are listed in Table 1.

TABLE 1

| Component | Unit | Ex. 5 (comp.) | Ex. 6 | Ex. 7 | Ex. 8 | Ex. 9 |
|---|---|---|---|---|---|---|
| Lupranol ® 2040 | Parts by wt. | 100 | 100 | 100 | 100 | 100 |
| IP-glycerol | Parts by wt. | — | 2.00 | 4.00 | 6.00 | 8.00 |
| Lupragen ® N 206 | Parts by wt. | 0.22 | 0.22 | 0.22 | 0.22 | 0.22 |
| DBTL | Parts by wt. | 0.06 | 0.06 | 0.06 | 0.06 | 0.06 |
| Tegostab ® B 8701 | Parts by wt. | 0.10 | 0.10 | 0.10 | 0.10 | 0.10 |
| Water | Parts by wt. | 2.18 | 2.18 | 2.18 | 2.18 | 2.18 |
| Viscosity of component A at 23° C. | [mPas] | 1380 | 1300 | 1180 | 1120 | 1060 |
| Mixing ratio, 100 parts of polyol:parts of Isoc. | | | 44.1 | 46.3 | 48.6 | 50.9 | 53.2 |
| Cream time | [sec] | 15 | 12 | 14 | 15 | 17 |
| Fiber time | [sec] | 80 | 80 | 80 | 85 | 92 |
| Full rise time | [sec] | 160 | 140 | 176 | 210 | 210 |
| Density DIN 53 420 | [g/l] | 51.7 | 51.0 | 49.6 | 51.0 | 47.5 |
| Elongation DIN 53 571 | [%] | 194 | 242 | 330 | 337 | 245 |
| Tack-free time | [min] | 5 | 7 | 10 | 16 | 20 |

Isocyanate (B) component:
In all experiments, Lupranat VP 9237/1 ® was used; the NCO content of this prepolymer was 28.4%.
Lupranol ® 2040:
Polyoxypropylene polyoxyethylene triol; OH number: 28 mg KOH/g
Lupragen ® N 206:
Bis(N,N-dimethymaminoethyl) ether, 70% in dipropylene glycol
Tegostab ® B 8701:
Silicone foam stabilizer

EXAMPLES 10 TO 14
Use of 1-butanol as reactive diluent (comparison)

The procedure of Examples 5 to 9 was followed, but, instead of isopropylideneglycerol, 1-butanol was added to the polyol component, and this was foamed.

TABLE 2

| Component | Unit | Ex. 10 (comp.) | Ex. 11 (comp.) | Ex. 12 (comp.) | Ex. 13 (comp.) | Ex. 14 (comp.) |
|---|---|---|---|---|---|---|
| Lupranol ® 2040 | Parts | 100 | 100 | 100 | 100 | 100 |
| 1-Butanol | Parts | — | 2.00 | 4.00 | 6.00 | 8.00 |
| Lupragen ® N 206 | Parts | 0.22 | 0.22 | 0.22 | 0.22 | 0.22 |
| DBTL | Parts | 0.06 | 0.06 | 0.06 | 0.06 | 0.06 |
| Tegostab ® B 8701 | Parts | 0.10 | 0.10 | 0.10 | 0.10 | 0.10 |
| Water | Parts | 2.18 | 2.18 | 2.18 | 2.18 | 2.18 |
| Viscosity of component A at 23° C. | [mPas] | 1380 | 1150 | 970 | 815 | 720 |
| Mixing ratio, 100 parts of polyol:parts of Isoc. | | | 44.1 | 48.8 | 53.4 | 58.1 | 62.8 |
| Cream time | [sec] | 13 | 14 | 14 | 14 | 15 |
| Fiber time | [sec] | 80 | 87 | 90 | 87 | 85 |
| Full rise time | [sec] | 155 | 130 | 180 | 180 | 200 |
| Density DIN 53 420 | [g/l] | 50.2 | 49.1 | 48.4 | 46.8 | collapse |
| Elongation DIN 53 571 | [%] | 208 | 312 | 324 | 157 | — |
| Tack-free time | [min] | 5 | 15 | 25 | 30 | — |

When comparing with Examples 5 to 9, it is noticeable that, even at 2 parts of butanol, the foams need substantially longer to cure completely (freedom from tack). The density of the foams fell consistently, and when 6 parts of butanediol were added the elasticity, tensile strength and elongation were no longer acceptable. When 8 parts are added, the foam collapses.

EXAMPLE 15
Use of Glycerol as Reactive Diluent (comparison)

It was not possible to produce foam, since even when 2 parts of glycerol were added to component A of the PU foams, shrinkage was such that test specimens could not be taken.

Details of components used:

Use in PU coating systems

EXAMPLES 16 TO 24

For the purpose of example, the reactive diluents of the invention were mixed with a hydroxy-functional acrylate resin (Lumitol® H 136, BASF), and also with various polyisocyanate curing agents (Basonat® HI 100, Basonat® P LR 8901, BASF) in accordance with the ratios in Table 3, and the formulations were catalyzed with dibutyltin dilaurate (DBTL) to accelerate curing. The processing times could be adjusted corresponding to the amount of catalyst added. Butyl acetate was used to adjust to an application viscosity of 20 s (DIN 53 211 cup with 4 mm outlet orifice). The solids contents were determined in accordance with DIN V 53 216 Part 1.

Coatings having a wet film thickness of 200 μm were applied to glass plates, using a film-casting frame. The resultant clear coatings were cured for 7 days under standard conditions of temperature and humidity, or baked for 20 min at 80° C. A clear coating without added reactive diluent was tested as comparison.

TABLE 3

Formulation examples for clear coatings

| | Example | | | | | | | | |
|---|---|---|---|---|---|---|---|---|---|
| | 16 (comp.) | 17 | 18 | 19 | 20 | 21 | 22 | 23 | 24 |
| Lumitol H 136 | 100 | 80 | 60 | 40 | 20 | 0 | 80 | 40 | 0 |
| Isopropylidene-glycerol | 0 | 20 | 40 | 60 | 80 | 100 | | | |
| Isopropylidene-TMP | | | | | | | 20 | 60 | 100 |
| Basonat P LR 8900 | 32.2 | 112.5 | 192.8 | 273.2 | 353.5 | 433.9 | | | |
| Basonat HI 100 | | | | | | | 91.6 | 210.4 | 329.2 |
| DBTL [%] (solids/solids) | 0.1 | 0.1 | 0.1 | 0.1 | 0.1 | 0.1 | 0.1 | 0.1 | 0.1 |
| Solids content of coating [%] | 47.8 | 64.2 | 73.2 | 78.9 | 82.8 | 85.9 | 58.8 | 71.4 | 77.4 |

All values given are parts by weight

Acrylate resin: Lumitol® H 136, solids content=70%, OHN=135 mg KOH/g

Polyisocyanates: Basonat® P LR 8900, low-viscosity HDI polyisocyanate, viscosity about 1200 mPas, solids content=100%, NCO content=22%

Basonat® HI 100, HDI polyisocyanate, viscosity about 3200 mPas, solids content=100%, NCO content=22%

The clear coatings have high flexibility and adhesion, and also very good scratch resistance.

In the examples, the reactive diluents were used as solvent replacement. The coating systems were adjusted to the same flow-cup viscosity, the proportion of the reactive diluent being reflected in the rising values for the solids content of the coating. The table shows that, compared with the standard system (16 comp.), the amount of solvent was reduced from 52.2% to, respectively, 14.1% and 22.6%. The properties of the coatings here remained consistently good.

We claim:

1. A process for preparing polyurethane comprising reacting at least bifunctional polyisocyanates with compounds having active hydrogen atoms, wherein the compounds having active hydrogen atoms comprise a polyol and a reactive diluent comprising a reaction product of a polyhydric alcohol with an aldehyde and/or ketone, wherein the aldehyde is selected from the group consisting of formaldehyde, acetaldehyde, propionaldehyde and isobutyraldehyde, and the ketone is selected from the group consisting of acetone, methyl ethyl ketone, methyl isobutyl ketone and cyclohexanone.

2. A process as claimed in claim 1, wherein the polyhydric alcohol has at least 3 hydroxyl groups.

3. A process as claimed in claim 1, wherein the polyhydric alcohol is selected from the group consisting of glycerol, trimethylolpropane and mixtures thereof.

4. A two-component polyurethane system comprising an at least bifunctional polyisocyanate component and a polyol component, wherein the polyol component comprises a polyol and a reactive diluent comprising a reaction product of a polyhydric alcohol with an aldehyde and/or ketone, wherein the aldehyde is selected from the group consisting of formaldehyde, acetaldehyde, propionaldehyde and isobutyraldehyde, and the ketone is selected from the group consisting of acetone, methyl ethyl ketone, methyl isobutyl ketone and cyclohexanone.

5. A polyurethane system as claimed in claim 4, wherein the polyhydric alcohol has at least 3 hydroxyl groups.

6. A polyurethane system as claimed in claim 4, wherein the polyhydric alcohol is selected from the group consisting of glycerol, trimethylolpropane and mixtures thereof.

* * * * *